United States Patent

Suzuki et al.

Patent Number: 6,064,775
Date of Patent: May 16, 2000

[54] IMAGE PROCESSING APPARATUS FOR ENHANCING TEXTURE AND THREE DIMENSIONAL EFFECT

[75] Inventors: Nobuo Suzuki; Yuji Kobayashi; Nobuyuki Takeo, all of Nakai-machi, Japan

[73] Assignee: Fuji Xerox Co., Ltd., Tokyo, Japan

[21] Appl. No.: 08/990,769

[22] Filed: Dec. 15, 1997

[30] Foreign Application Priority Data

Dec. 27, 1996 [JP] Japan .................................. 8-349614
Oct. 17, 1997 [JP] Japan .................................. 9-284891

[51] Int. Cl.[7] .............................. G06T 5/20; G06T 7/40; G06T 15/00
[52] U.S. Cl. ...................... 382/254; 382/266; 382/277; 382/108; 382/154; 382/170
[58] Field of Search .................................. 382/254, 260, 382/261, 262, 263, 264, 266, 269, 274, 108, 154, 165, 170, 181, 190, 171

[56] References Cited

U.S. PATENT DOCUMENTS

| | | |
|---|---|---|
| 4,229,797 | 10/1980 | Ledley ................................ 382/108 |
| 5,681,112 | 10/1997 | Kuroda et al. .......................... 382/274 |
| 5,832,134 | 11/1998 | Avinash et al. ......................... 382/274 |
| 5,841,889 | 11/1998 | Seyed-Bolorforosh ................. 382/274 |

FOREIGN PATENT DOCUMENTS 7-203230  8/1995  Japan .

*Primary Examiner*—Scott Rogers
*Attorney, Agent, or Firm*—Oliff & Berridge, PLC

[57] ABSTRACT

An image processing apparatus, which improves the qualitative effect or 3-dimensional effect on feeling of a subject picture, first analyzes the feature of the input picture thereby to evaluate feature values such as the mean value, histogram center value, variance, etc. pertaining to the lightness, saturation, and edge value. It discriminates the picture to be a texture stuff, colored stuff, etc. based on these feature values, and determines an image process operator and an image process parameter suitable for the purpose of process. It implements the image process that best matches with the picture based on the determined process operator and process parameter.

13 Claims, 24 Drawing Sheets

CLASSIFICATION RULE INFORMATION

| INSTRUCTION | CLASSIFYING MEANS |
|---|---|
| Q-EFFECT | MEANS OF "Q-EFFECT" |
| SIZZLE-EFFECT | MEANS OF "SIZZLE-EFFECT" |
| LIGHTNESS-UP | MEANS OF "LIGHTNESS-UP" |
| HARDNESS-UP | MEANS OF "HARDNESS-UP" |
| SOFTNESS-UP | MEANS OF "SOFTNESS-UP" |
| ⋮ | ⋮ |

FIG. 5

ITEMS OF IMAGE DATA ANALYSIS

| ATTRIBUTE PARAMETER | FEATURE VALUES |
|---|---|
| L* | AVERAGE VALUE |
| | HISTOGRAM CENTER VALUE |
| | HISTOGRAM VARIANCE |
| | HISTOGRAM SINGULAR POINT |
| C* | AVERAGE VALUE |
| | HISTOGRAM CENTER VALUE |
| | HISTOGRAM VARIANCE |
| | HISTOGRAM SINGULAR POINT |
| EDGE VALUE (SPATIAL FREQUENCY INFORMATION) | AVERAGE VALUE |
| | HISTOGRAM CENTER VALUE |
| | HISTOGRAM VARIANCE |
| | HISTOGRAM SINGULAR POINT |
| | EDGE DIRECTION |
| | EDGE DISTRIBUTION |

FIG. 7

PROCESS OPERATOR/CHARACTER TABLE

| CATEGORY NAME | BASIC DESCRIPTION | PROCESS OPERATOR | | |
|---|---|---|---|---|
| | | ATTRIBUTE PARAMETER | ALGORITHM | PROCESS CHARACTER |
| TEXTURE STUFF | >SHARPNESS-UP | EDGE VALUE | >DF | HIGH-BAND EMPHASIS |
| BLACK STUFF | >CONTRAST-UP | L* | >LUT | B+/D-/E+ |
| | >EDGE EMPHASIS | EDGE VALUE | >DF | HIGH-BAND EMPHASIS |
| COLORED STUFF | >COLOR EMPHASIS | C* | -a*LUT -b*LUT | A+/B+ |
| LIGHTNESS-UP | >L*-UP | L* | >LUT | A+/C+ |
| CATCH-LIGHT TYPE | >CONTRAST EMPHASIS | L* | >LUT | B+/D-/E+ |
| ⋮ | ⋮ | ⋮ | ⋮ | |

FIG.8A

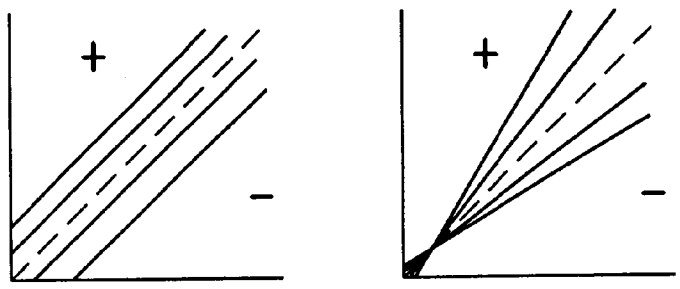
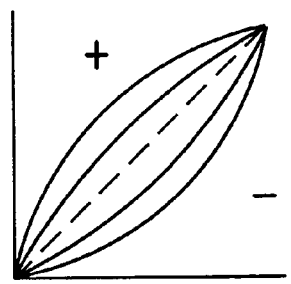
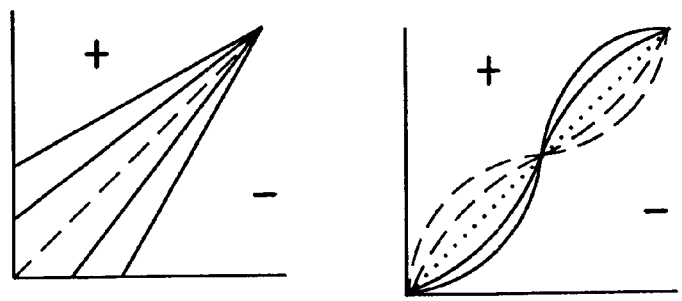
TYPES OF LOOKUP TABLE
FIG.8B

| ATTRIBUTE PARAMETER/ PRESCRIPTION | HISTOGRAM VARIANCE | PROCESS CHARACTER |
|---|---|---|
| L*/CONTRAST-UP | CONCENTRATED IN DARK PORTION | B+ |
| | CONCENTRATED IN BRIGHT PORTION | D- |
| | DISTRIBUTED EVENLY | E+ |
| L*/LIGHTNESS-UP | CONCENTRATED IN DARK PORTION | A+ |
| | DISTRIBUTED EVENLY | C+ |
| C*/COLOR EMPHASIS | CONCENTRATED IN LOW-SATURATION PORTION | B+ |
| | DISTRIBUTED EVENLY | E+ |
| EDGE VALUE/EDGE EMPHASIS | — | DEFAULT |
| ⋮ | ⋮ | ⋮ |

FIG. 10

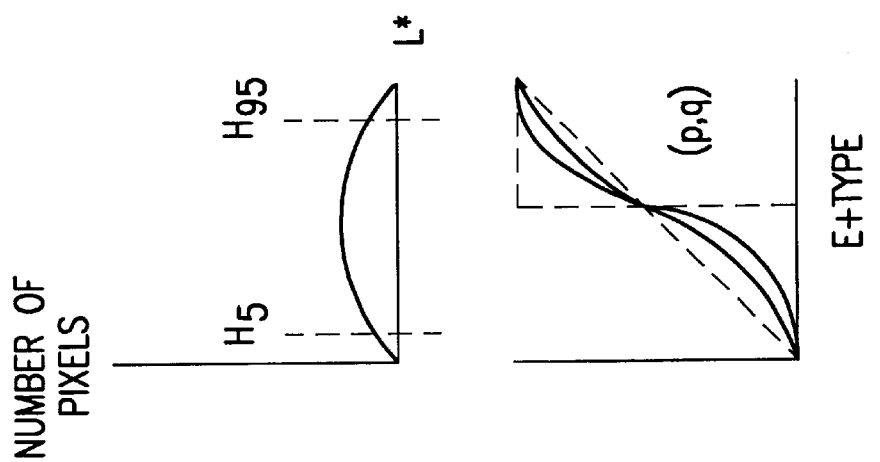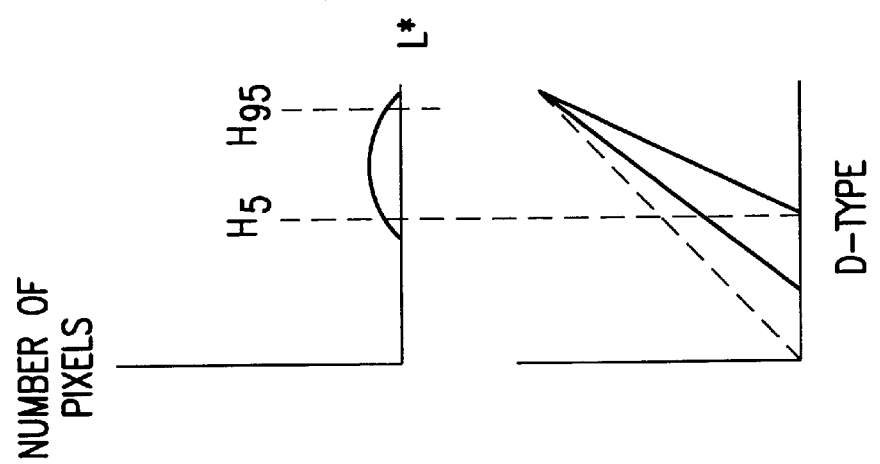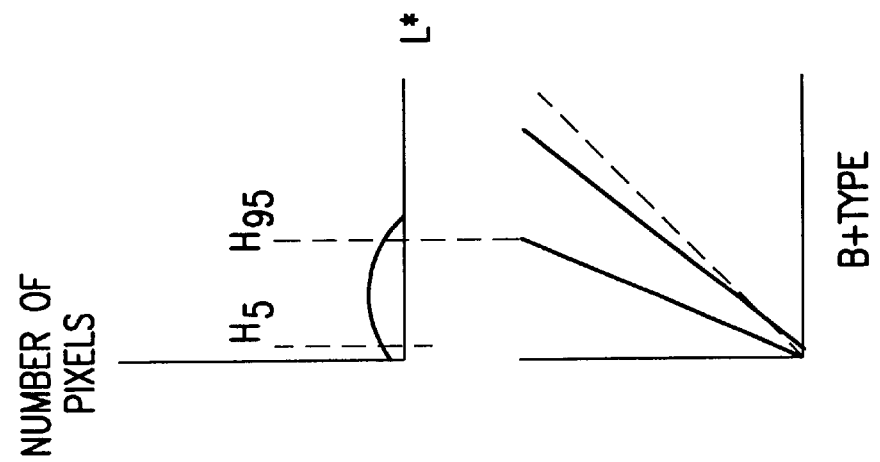

MANNERS OF PROCESS PARAMETER DETERMINATION

| ① DEFAULT VALUE | PRESET VALUES FOR OPERATORS |
|---|---|
| ② CALCULATION FROM FEATURE VALUES | CALCULATE OPTIONAL VALUE |
| ③ USER'S INFORMATION | USER INSTRUCTS STRENGTH THROUGH GUI |
| ④ VARIATION (CANDIDATES PRESENTED) | COMBINATION OF ① AND ③ |

FIG. 17

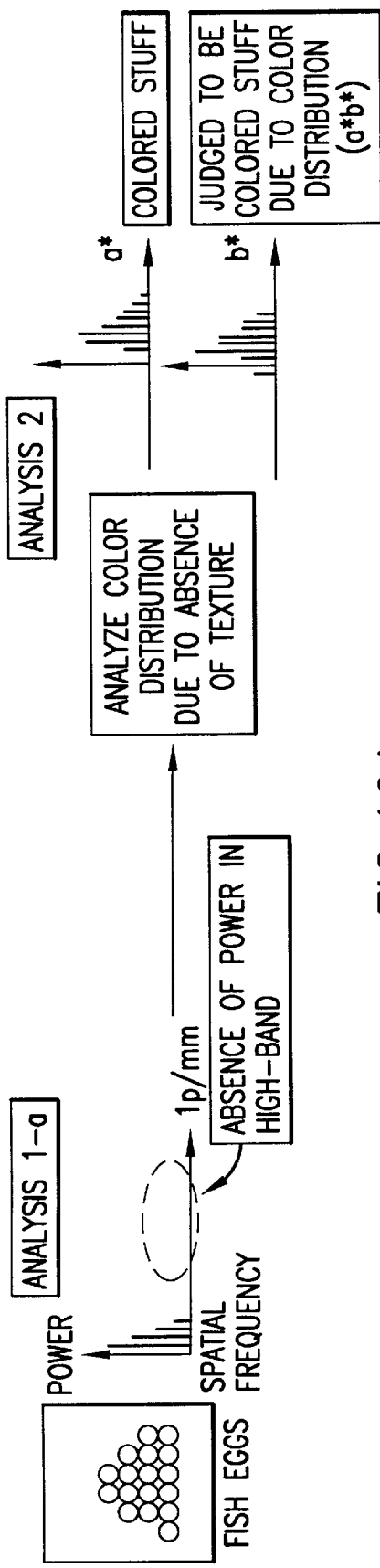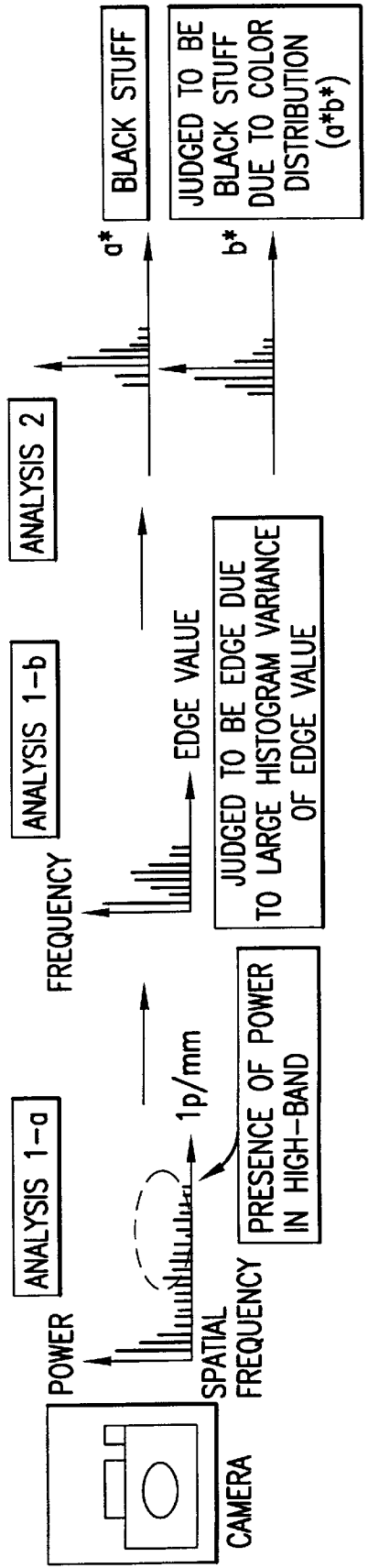
FIG.19A
FIG.19B

* A KIND OF JAPANESE PRESERVED FOOD

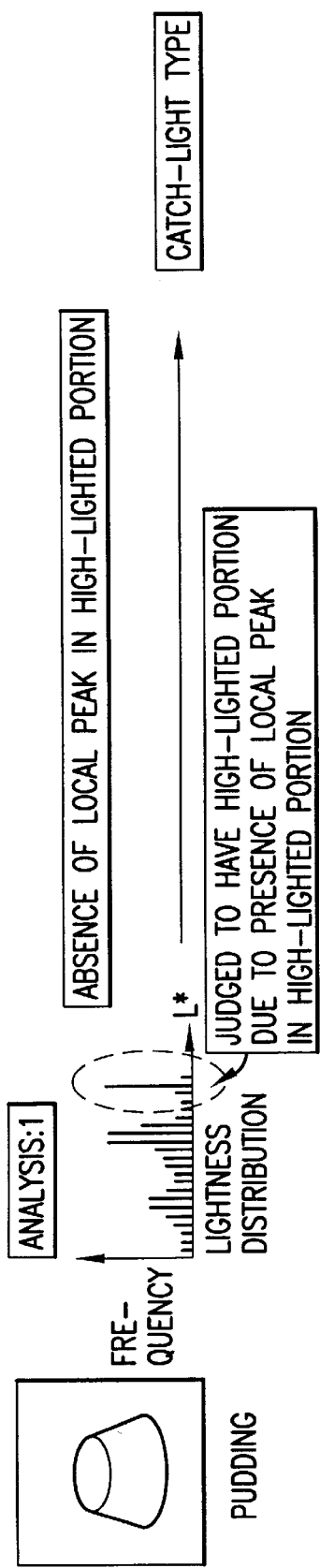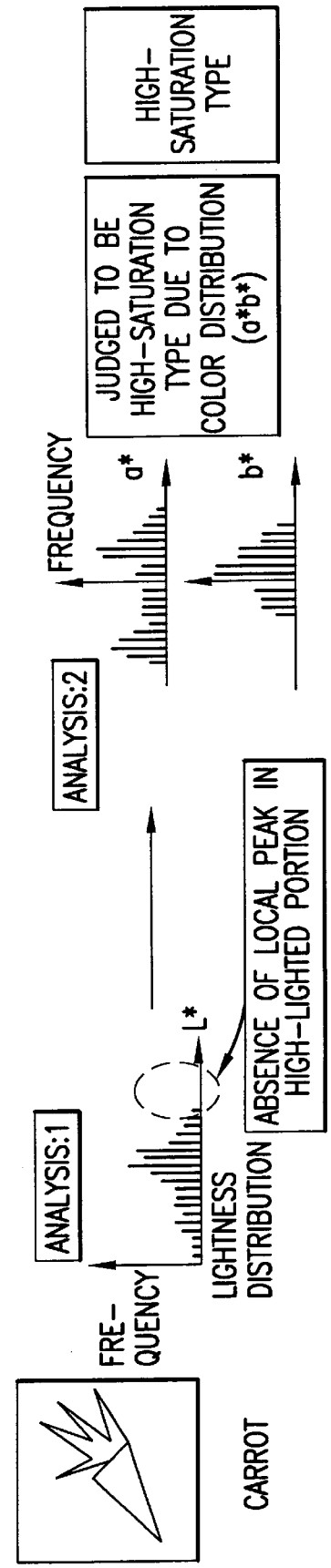
FIG.21A
FIG.21B

FIG. 22

TABLE 2 FOR 3D-EFFECT

| IMAGE ANALYSIS | | | SUBJECTS |
|---|---|---|---|
| EDGE | CATCH-LIGHT | COLOR | |
| ● | ○ | ● | SCENES OF ARTIFACTS, JEWELS, ACCESSORIES |
| ● | ○ | ● | PUDDING, TOFU |
| ● | ○ | ● | CAMERAS, AUDIO GOODS, GLASS GOODS |
| ● | ○ | ● | INTERIOR GOODS |
| ● | × | ○ | POSITIVE SCENES |
| ● | × | ○ | POSITIVE SCENES, FRESH FISHES, FRUITS, VEGETABLES |
| ● | × | × | NEGATIVE SCENES, LACQUER GOODS, ANTIQUES |
| ● | × | × | NEGATIVE SCENES, LACQUER GOODS, HIGH-GRADE DRAPERY, PAINTINGS, ANTIQUES |

ANALYSIS

Classification:
- CATCH-LIGHT TYPE
- HIGH-SATURATION TYPE
- LOW-SATURATION TYPE

TABLE 1 FOR 3D-EFFECT

| SUBJECTS | | PRESCRIPTION | MAIN OPERATOR |
|---|---|---|---|
| | SCENES | | |
| URBAN | | | |
| CAMERAS, AUDIO GOODS, GLASS GOODS, INTERIOR GOODS STILL LIVES 1 | | CONTRAST-UP | L*LUT |
| JEWELS, ACCESSORIES STILL LIVES 1 | | | |
| PUDDING, TOFU STILL LIVES 2 | | | |
| DYNAMIC/POSITIVE SCENES | | COLOR-UP (THICK) | C*LUT |
| FRESH FISHES, FRUITS, VEGETABLES STILL LIVES 2 | | | |
| QUIESCENT/PASTORAL SCENES | | EDGE CONTRAST-UP | DF |
| LACQUER GOODS, HIGH-GRADE DRAPERY, PAINTINGS, ANTIQUES STILL LIVES 2 | | | |

CLASSIFICATION — PROCESSING

IMAGE PROCESSING APPARATUS FOR ENHANCING TEXTURE AND THREE DIMENSIONAL EFFECT

BACKGROUND OF THE INVENTION

1. Field of the Invention

The present invention relates to an image processing apparatus which performs such image processing as the control of image quality for image data, and particularly to an image processing apparatus which determines a process according to the purpose of process such as the enhancement of the qualitative effect on feeling (hereinafter simply called "Q-effect") and 3-dimensional effect on feeling (hereinafter simply called "3D-effect") and the feature of each subject picture, and implements the selected process that best meets the picture, thereby allowing the user to improve the picture easily as intended.

2. Description of the Prior Art

Various image processing apparatus have been developed in recent years for editing, manipulating and analyzing of image data. Among a variety of image processing functions, the fundamental function is to display a subject picture on an image display device, to let the user specify a portion of picture to be processed and an image process operator which manipulates the appearance of image such as the contrast, sharpness and edging, and to occasionally set a process parameter for finer control, and implement the process thereby to improve the picture as intended.

These image processing apparatuses in general have a number of image process operators for dealing with the image composition and quality based on "tone inversion," "image rotation," "sharpness adjustment," "edge emphasis," "contrast enhancement," etc., and the user uses these operators in carrying out the image processing and occasionally sets process parameters of individual operators for finer control thereby to improve the picture as intended. On this account, most part of the image process is carried out repeatedly by the user on a trial-and-error basis. Specifically, the user specifies a certain operator and parameter, carries out the image processing based on the parameter, and assesses the result of process. The user will make different settings of operators and parameters, and carry out the image processing repeatedly until the intended result is obtained.

These conventional image processing apparatuses require of the user at image processing to instruct a certain operator, e.g., "edge emphasis" or "contrast enhancement." However, the operator specified by the user can possibly be inappropriate for the subject picture.

Image data has a variety of image qualities derived from polishing subjects such as a camera, radio and glass, non-polishing subjects such as a scenery, vegetation, fresh food and fruit, light-projected subjects, and shadowy subjects. Implementation of image processes based on a same operator for these various subject pictures will end up in different results, and the user's intention to improve the Q-effect and 3D-effect of the pictures may not be attained satisfactorily.

Conventional image processing apparatuses let the user specify an image process operator that deemed to be appropriate for the purpose of process and set a process parameter for the operator, and implement the image process based on the operator and the parameter instructed. The feature of the subject picture is analyzed subjectively by the user for the setting of a proper operator and parameter. Accordingly, the setting of a proper operator and parameter relies entirely on the user's skill, and it is difficult for unskilled users, who will be obliged to repeat the image processing too many times on a trial-and-error basis, to carry out the image processing conveniently.

SUMMARY OF THE INVENTION

The present invention is intended to overcome the foregoing prior art deficiency, and its prime object is to provide an image processing apparatus capable of processing appropriately image data having a variety of features based on the analysis of the feature of each subject picture with respect to the purpose of process and the setting of a proper image process operator and a proper parameter that match the feature of the picture.

The invention resides in an image processing apparatus which comprises an image quality control instructing section which receives quality control instruction information for input image data, an image data recognizing section which recognizes attribute information of the image data, an image process operator determining section which determines an image process operator in accordance with the quality control instruction information received by the image quality control instructing section and image data attribute information recognized by the image data recognizing section, an image process parameter determining section which determines an image process parameter that establishes a characteristic (hereinafter abbreviated "charac(s) .") of the image process operator determined by the image process operator determining section, and an image processing section which implements the image process for the image data based on the image process operator and image process parameter. Items of image quality control instructed by the user include "Q-effect," "sizzle-effect" and "3D-effect."

The image data recognizing section of the inventive image processing apparatus comprises an image data analysis section which analyzes input image data, and the image process parameter determining section determines an image process parameter based on the image analysis information provided by the image data analysis section.

The image analysis section of the inventive image processing apparatus analyzes input image data to detect the presence or absence of texture of the image data and discriminates the subject picture to be texture stuff on detecting the presence of texture, the image process operator determining section and the image process parameter determining section determine an image process operator and the image process parameter for enhancement of sharpness for the image data found to be of texture stuff, and the image processing section implements the image process based on the image process operator and the image process parameter determined for the sharpness enhancement thereby to improve the Q-effect of the image data.

The image analysis section of the inventive image processing apparatus analyzes input image data to detect the presence or absence of texture and the color distribution of the image data and discriminates the subject picture to be black stuff on detecting the absence of texture and virtually monochromatic distribution, the image process operator determining section and the image parameter determining section determine an image process operator and an image process parameter for enhancement of contrast of lightness for the image data found to be black stuff, and the image processing section implements an image process based on the image process operator and image process parameter determined for the contrast enhancement thereby to improve the Q-effect of the image data.

The image analysis section of the inventive image processing apparatus analyzes image data to detect the presence or absence of texture and the color distribution of the image data and discriminates the subject picture to be colored stuff on detecting the absence of texture and virtually chromatic distribution, the image process operator determining section and the image process parameter determining section determine an image process operator and image process parameter for the enhancement of saturation for the image data found to be of colored stuff, and the image processing section implements an image process based on the image process operator and the image process parameter determined for the saturation enhancement thereby to improve the Q-effect of the image data.

The image analysis section of the inventive image processing apparatus analyzes input image data to detect the presence or absence of catch-light of the image data and discriminates the subject picture to be of catch-light type on detecting the presence of catch-light, the image process operator determining section and the image process parameter determining section determine an image process operator and an image process parameter for the enhancement of contrast of lightness for the image data found to be of catch-light type, and the image processing section implements the image process based on the image process operator and the image process parameter determined for the contrast enhancement thereby to improve the 3D-effect of the image data.

The image analysis section of the inventive image processing apparatus analyzes input image data to detect the presence or absence of catch-light and the color distribution in the image data and discriminates the subject picture to be of low-saturation type on detecting the absence of catch-light and virtually chromatic distribution, the image process operator determining section and the image process parameter determining sections determine an image process operator and image process parameter for the enhancement of contrast of edge for the data found to be low-saturation type, and the image processing section implements the image process based on the image process operator and image process parameter determined for the edge contrast enhancement thereby to improve the 3D-effect of the image data.

The image analysis section of the inventive image processing apparatus analyzes input image data to detect the presence or absence of catch-light and the color distribution of the image data and discriminates the subject picture to be of high-saturation type on detecting the absence of catch-light and virtually chromatic distribution, the image process operator determining section and the image process parameter determining section determine an image process operator and an image process parameter for enhancement of contrast of saturation for the image data found to be of high-saturation type, and the image processing section implements the image process based on the image process operator and the image process parameter determined for the saturation contrast enhancement thereby to improve the 3D-effect of the image data.

BRIEF DESCRIPTION OF THE DRAWINGS

FIG. 5 is a table listing classification rule information;

FIG. 7 is a table listing the items of image data analysis;

FIGS. 8A and B are a table and diagrams, respectively, showing the process operators and their characteristics;

FIG. 10 is a table listing the correspondence among the attribute parameter and prescription, the histogram variance and the process charac.;

FIGS. 11A–11C are a set of diagrams used to explain the types of lookup tables used in the "contrast-up" process;

FIG. 17 is a table showing the determination of process parameter;

FIGS. 19A–C are a diagrams explaining specifically the image analysis in the image process for the purpose of Q-effect enhancement;

FIGS. 21A–C are a diagrams explaining specifically the image analysis in the image process for the purpose of 3D-effect enhancement; and FIG. 22 is a table showing the correlation among image analysis, classification, and processing in the image process for the purpose of 3D-effect enhancement.

DESCRIPTION OF THE PREFERRED EMBODIMENT

Figure 1:
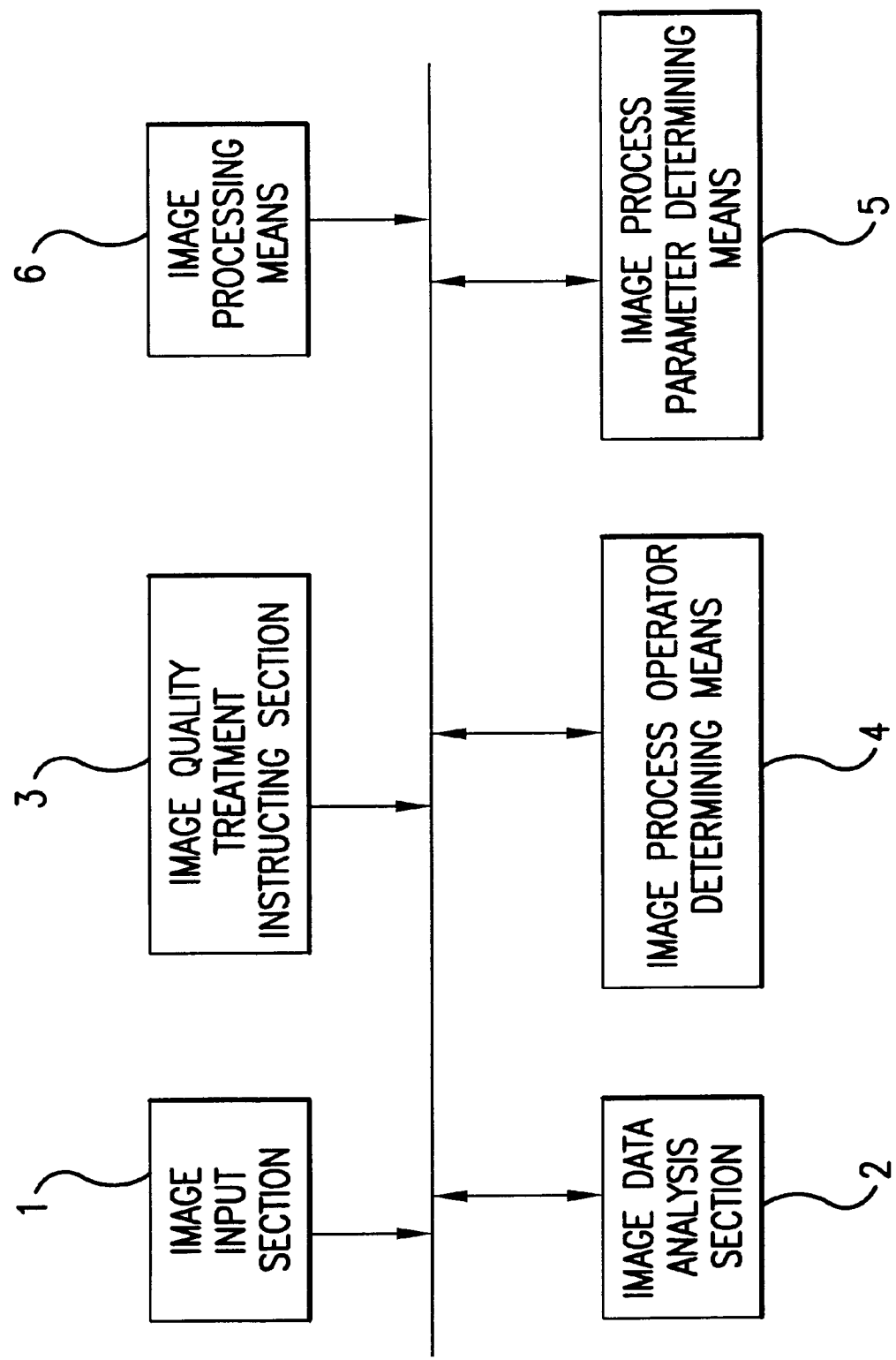
FIG. 1 is a block diagram showing the arrangement of the image processing apparatus based on this invention.

An embodiment of the present invention will be explained in detail with reference to the drawings. FIG. 1 shows the overall arrangement of the image processing apparatus based on an embodiment of this invention, in which the apparatus consists of an image input section 1, an image data analysis section 2, an image quality control instructing section 3, an image process operator determining section 4, an image process parameter determining section 5, and an image processing section 6. These sections are connected to each other through a data bus.

Figure 2:
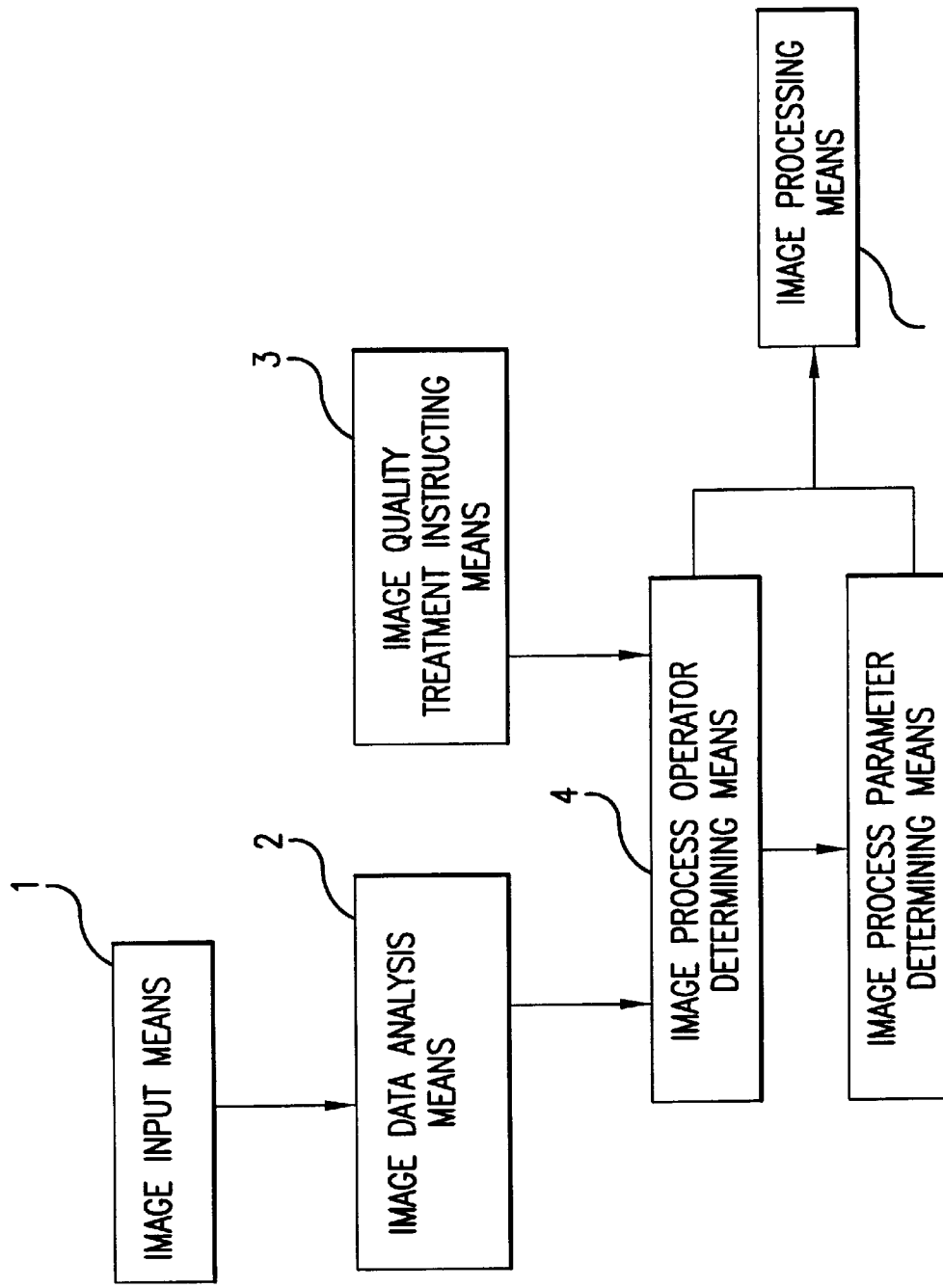
FIG. 2 is a diagram showing the arrangement of the apparatus in terms of internal data transaction.

FIG. 2 shows the arrangement of the apparatus in terms of internal data transaction. The operations of the individual sections will be explained with reference to FIG. 2. The image input section 1 receives digital data of image information provided by various image sourcing devices such as a scanner, digital VTR, and digital video camera. The image data analysis section 2 implements various image analyses for the image information received by the image input section 1. The image quality control instructing section 3 recognizes information of quality control instructed by the user. The image process operator determining section 4 determines a process operator based on the information provided by the image data analysis section 2 and quality control instructing section 3, and the image process parameter determining section 5 determines a processing factor of the determined operator. The image processing section 6, which receives the process operator and the process parameter determined, implements the image process for the image data based on these operator and parameter and information of the image portion where the process parameter is effective.

The analysis result of image data may be derived from image attribute information supplied from the outside, for example, besides the actual analysis result provided by the image data analysis section 2. In this case, the image feature data entered by the user is dealt with equally to the image analysis data.

Figure 6A:
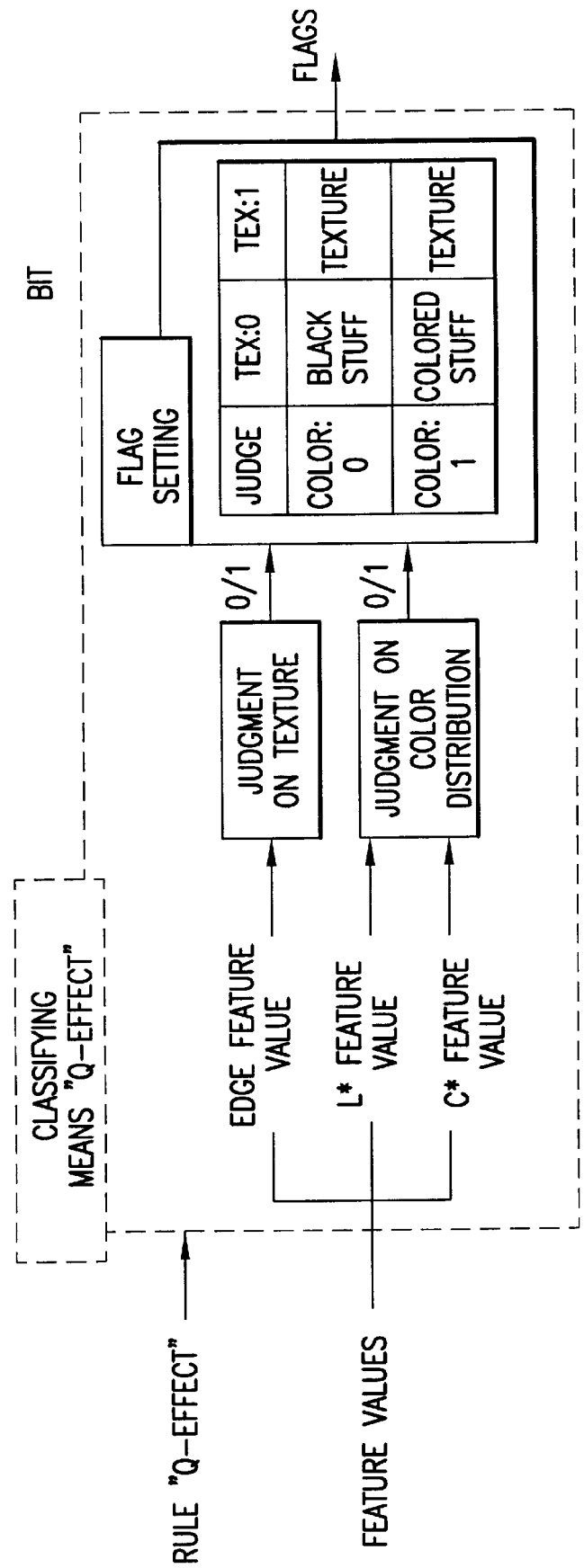
FIGS. 6A and 6B are diagrams showing the image data classifying means.
Figure 6B:
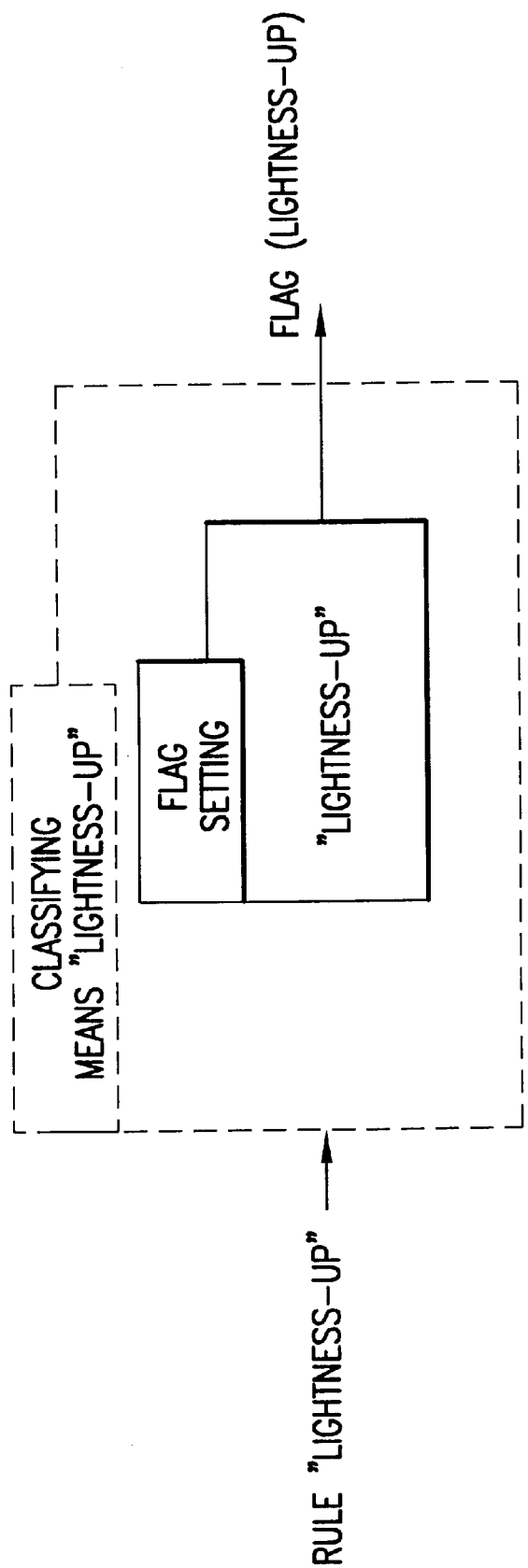

Next, the operation of the image processing apparatus of this embodiment of invention will be explained specifically with reference to the flowchart of FIG. 3. Initially, step 301 receives the user's instruction of a control to be carried out for the input image. The control is among "Q-effect", "sizzle-effect", etc. shown in FIG. 5. The next step 302 selects a classification rule for the subject picture. Specifically, the user's control instruction received in step 301 is given to the classification rule information selecting section 403 shown in FIG. 4, and it takes out certain classification information selectively from the classification rule information holding section 404 in accordance with the instruction. The classification rule information includes various classifying means in correspondence to user's control instructions as shown in FIG. 5. FIGS. 6A and 6B show, as examples, the classifying means for user's instructions "Q-effect" and "lightness-up," respectively. The step 302 selects a classifying means such as the one shown in FIG. 6A or FIG. 6B in accordance with the user's control instruction received in step 301.

Step 306 receives image data 306, and the next step 307 analyzes the image data and calculates the feature value. FIG. 7 shows, as examples, the resulting feature values listed in correspondence to image data attribute parameters. Image data attribute parameters include lightness information L*, saturation information C*, and edge value (spatial frequency information), and these parameters have analyzed feature values of image data in terms of the average value, histogram center value, variance, etc. as shown in FIG. 7 calculated from the analysis result of the input image data. Instead of calculating all feature values listed in FIG. 7, only necessary feature values which depend on the user's instruction may be calculated selectively.

Step 303 provides the analyzed feature values obtained in step 307 for the classification rule selected in step 302, and implements the image data classification, which will be explained in connection with the examples of FIGS. 6A and 6B. For user's instruction "Q-effect", the feature values obtained in step 307 are given to the classifying means "Q-effect" of FIG. 6A. The feature values given include the average value, histogram center value, etc. pertaining to the edge value and saturation C* shown in FIG. 7. Judgment on the presence or absence of texture and the color distribution is made for these feature values, and the resulting 0/1 class flags for the texture and color distribution are appended to the classification rule information (i.e., Q-effect) as shown in FIG. 6A.

For user's instruction "lightness-up", in which case the image process does not depend on feature values, no feature values are appended to the classification rule information as shown in FIG. 6B.

Figure 3:
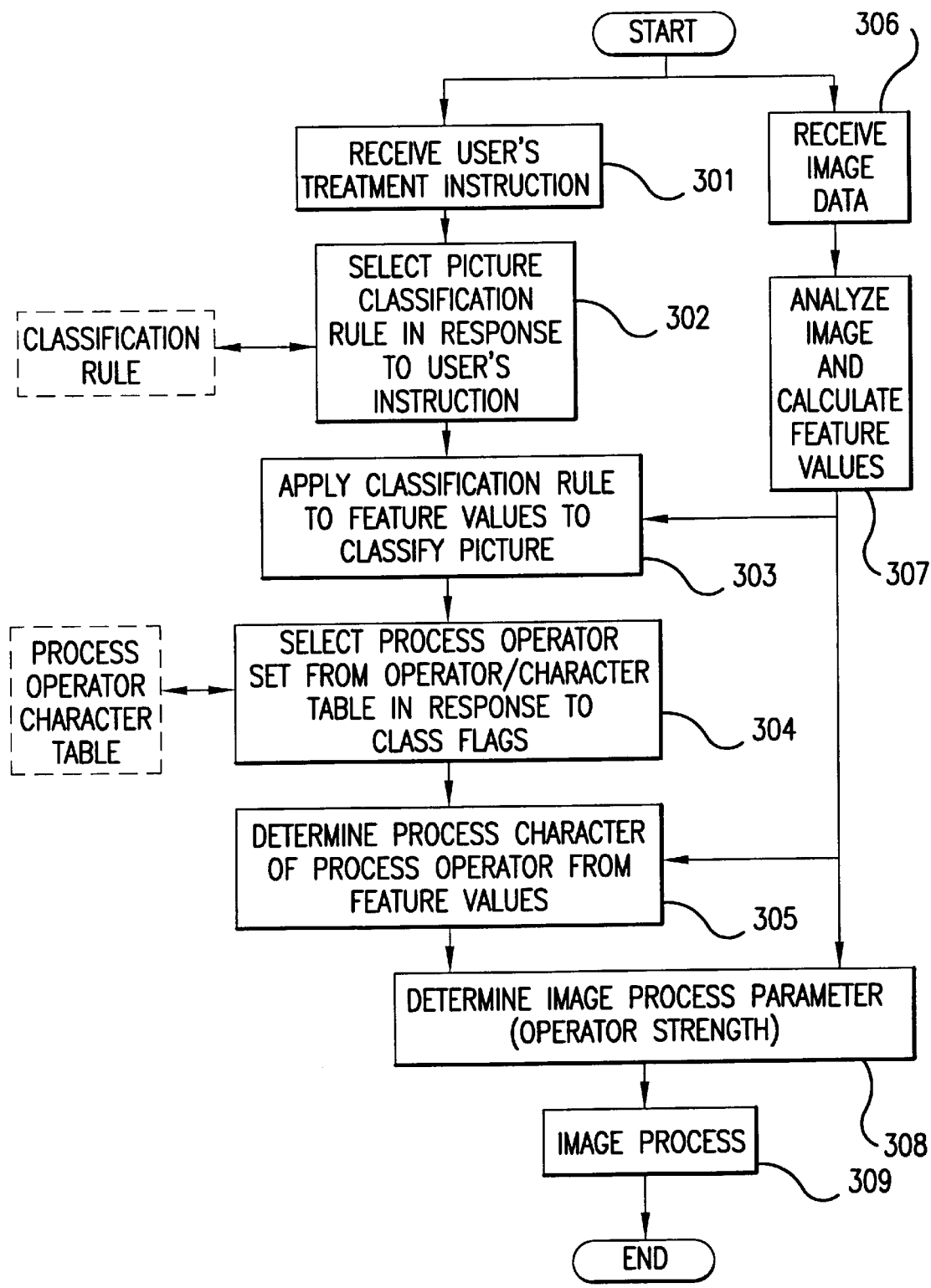
FIG. 3 is a flowchart showing the image process based on this invention.
Figure 4:
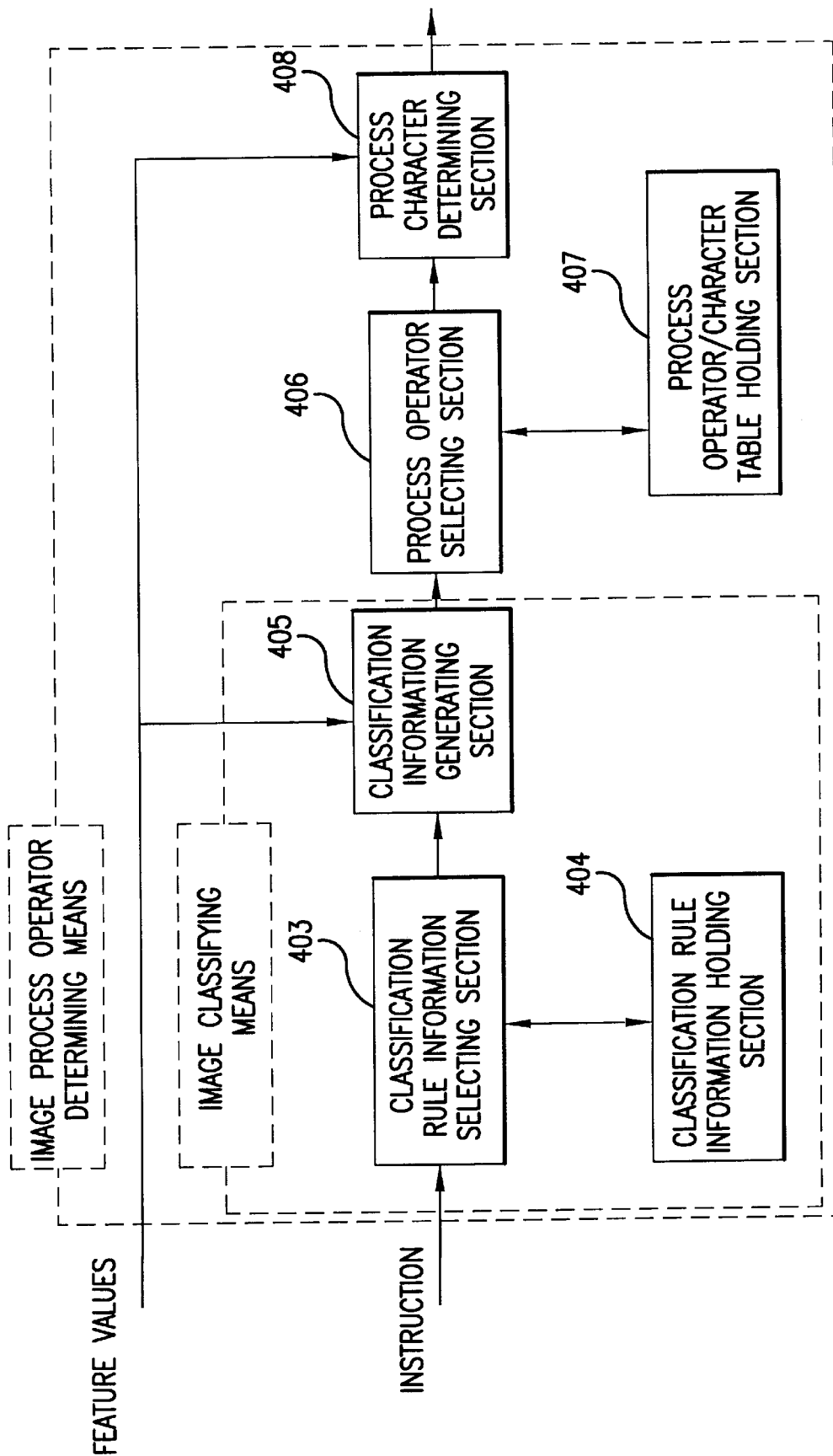
FIG. 4 is a block diagram of the process operator determining section of the inventive image processing apparatus.

After the class flags are produced, the sequence proceeds to step 304 on the flowchart of FIG. 3. This step 304 selects a process operator from the process operator/charac. table in accordance with the produced class flags. FIG. 8 shows an example of the process operator/charac. table, which includes items of the category name, basic prescription, and process operator. The item of process operator includes items of the attribute parameter, algorithm, and process charac. The item of basic prescription indicates the process mode for the category. The process operator describes the attribute parameter used in the process mode, algorithm of digital filter (DF) and lookup table (LUT) used in the image process, and candidate process characs. (filter shape, tone curve shape, etc.). There are five kinds of lookup tables A, B, C, D, and E as shown for example in the lower section of FIG. 8.

In response to the class flags produced in step 303, a process operator set is selected from the process operator/charac. table. Namely, depending on as to whether the class flag is "texture stuff", "black stuff", "colored stuff" or "lightness-up, " for example, a process operator set is selected for the category name by the process operator selecting section 406 shown in FIG. 4. Specifically, the operator selecting section 406 makes access to the process operator/charac. table holding section 407 to select a certain process operator set and basic prescription.

Figure 9:
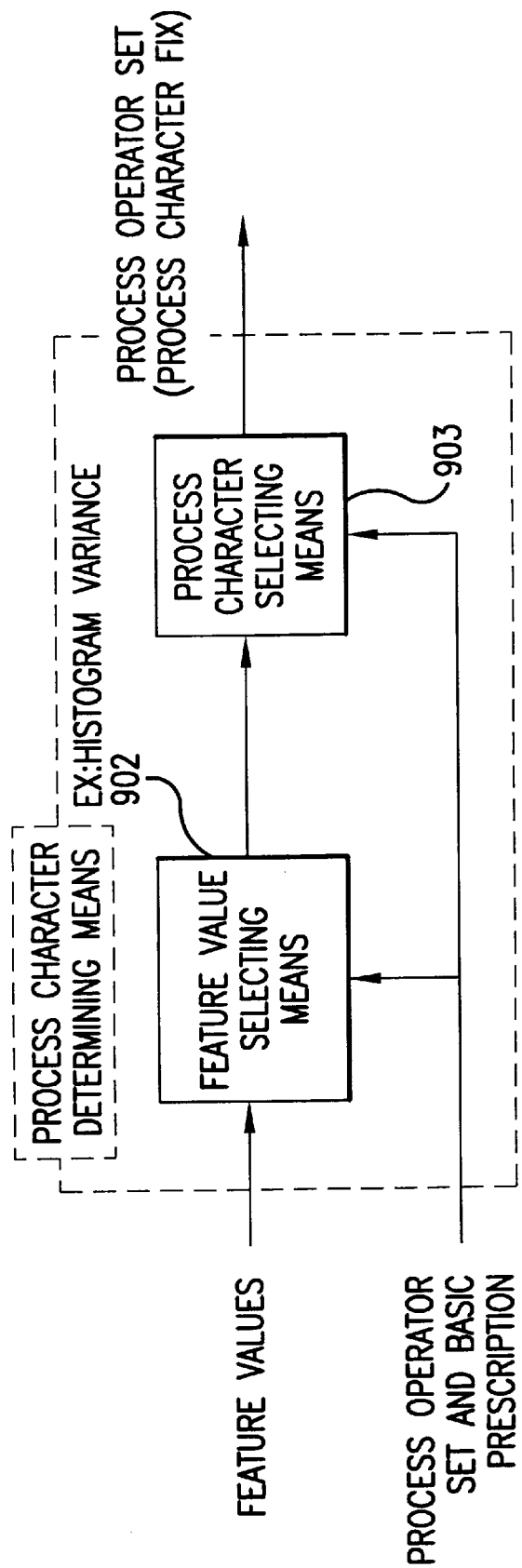
FIG. 9 is a block diagram of the arrangement of the process charac. determining section.

Following the selection of a process operator set, the next step 305 on the flowchart of FIG. 3 determines the process charac. of the process operator from the feature value. This is implementedby the process charac. determining section 408 shown in FIG. 4. FIG. 9 shows the details of the process charac. determining section 408. In FIG. 9, the feature value selecting section 902 receives feature values of all kinds resulting from the image analysis and selects a feature value for determining a process charac. This selecting operation from among the feature values of lightness L*, saturation C*, and the mean value and histogram center value, etc. of the edge value listed in FIG. 7 is based on the attribute parameter and algorithm included in the process operator set selected and given to the feature value selecting section 902 in step 304. The process charac. selecting section 903 selects the optimal process charac. from among the candidates of process charac. by using the selected feature value, e.g., histogram. The selected process charac. and its associated attribute parameter and algorithm in the process operator set are delivered as the finally-selected process operator set.

Next, the manner of selecting the optimal process charac. from among multiple candidates by use of the image feature value will be explained. The items of image data analysis listed in of FIG. 7 include feature values used for the classification of step 303 on the flowchart of FIG. 3. The feature value used to determine the process charac. is selected from among these feature values. For attribute parameter L* in the process operator set, the L* histogram variance is selected. For attribute parameter C*, the (a*/b*) histogram variances are selected. For the edge value, the edge value histogram variance is selected.

FIG. 8 lists candidates of process charac. of each category. The optimal one of these candidates is selected by use of the feature value of histogram variance mentioned above and the basic prescription. The brief list of basic prescriptions and process operators for individual categories in FIG. 8 is added by the feature value information to show the correspondence of process characs., as listed in the table of FIG.

10. Some different categories have the same basic prescription and process operator. For example, both categories "black stuff" and "catch-light type" have the image process for emphasizing the contrast of L* (the uppermost row of the table in FIG. 10).

Step 308 on the flowchart of FIG. 3 determines an image process parameter which establishes the strength of an operator. The reason for the selection of process characs. for each attribute parameter and prescription on the table of FIG. 10 will be explained first, and next the calculation of image process parameter from the feature value will be explained specifically.

Among the basic prescriptions, those pertinent to the color process will be explained first. Image data used in the following explanation is assumed to be expressed in terms of the L*a*b* space. The feature value of the L* histogram variance is calculated, for example, to be $H_5$ and $H_{95}$ that are L* values at which 5% and 95% of all pixels of the subject picture are included on the histogram of L* value as shown in FIG. 11.

(1) L*/Contrast-Up
<Process Charac.>

The term "contrast-up" stands for the process of making dark portions much darker and bright portions much brighter, and it is basically the rendition of tone rising. For this rendition, the lookup table of E+ type (the right-hand one in FIG. 11) is designated.

In this case, if pixel values gather to one side (dark or bright) of the dynamic range of L* (shown as the left-hand and middle ones in FIG. 11), it is necessary to widen the overall range to some extent before rendering the tone rising with the E-type lookup table.

As to which of the three patterns of FIG. 11 does the picture belong can be judged based on the comparison of the values $H_5$ and $H_{95}$ with L*=50. By setting the threshold values $H_{low}$=30 and $H_{high}$=70, for example, a pattern is selected as follows.

For $H_5$ <$H_{low}$ and $H_{95}$ <$H_{high}$, the left-hand pattern in FIG. 11 is selected. For $H_5$ >$H_{low}$ and $H_{95}$ >$H_{high}$, the middle pattern is selected. Otherwise, the right-hand pattern is selected.

<Process parameter>

FIG. 11 shows process parameters of strength 0 (Min) by the dashed line and strength 100 (Max) by the solid line. For the determination of process parameter from the feature value on the second row of FIG. 17, this Max value is used. The strength 100 is subjected to restriction in terms of the mathematical limit of the lookup table and the usual tone shape which does not cause the creation of defects of image in general color reproduction.

For the left-hand and middle lookup tables of FIG. 11, the strength 100 is obtained uniquely from the values of $H_5$ and $H_{95}$ by drawing dashed lines down as shown.

For the right-hand E-type lookup table in FIG. 11, the Max value takes the dash-dot line mathematically, however, this is not practical. The major premise of this case is that defects of image such as tone jump and collapse at shadow do not arise in the portion of the steepest tone where the 2-degree derivative of the mid-tone lookup table varies significantly. For the prevention of tone jump, the lookup table has its tangential gradient suppressed below 1.5 preferably.

When the E+ type lookup table is approximated boldly by two quadratic curves, three coefficients of the quadratic polynomials can be obtained mathematically based on the conditions that the curves pass through end points (0,0) and (p,q), and (p,q) and (100,100), respectively, and that the two quadratic curves have the same derivative that is 1.5 or less at their contact point (p,q).

The image process is implemented with the lookup table obtained as described above, and the number of effective tones of the processed picture is calculated. If it decreases by a certain rate (e.g.,20%) or more relative to that of the original picture, the maximum gradient of the lookup table is further reduced to calculate the lookup table with strength 100 again. The foregoing steps are repeated until the above-mentioned conditions are met thereby to obtain the optimal process parameter.

Actually, however, certain subject pictures processed with the lookup table with strength 100 can possibly make the viewer uncomfortable. This situation can be dealt with by making multiple lookup tables with strengths 25, 50, and 75 based on the linear interpolation using the lookup tables with strengths 0 and 100 as the case of item 4: Variation in FIG. 17, and processing the picture with these lookup tables and letting the user select a result.

(2) L*/Lightness-Up
<Process Charac.>

Figure 12A:
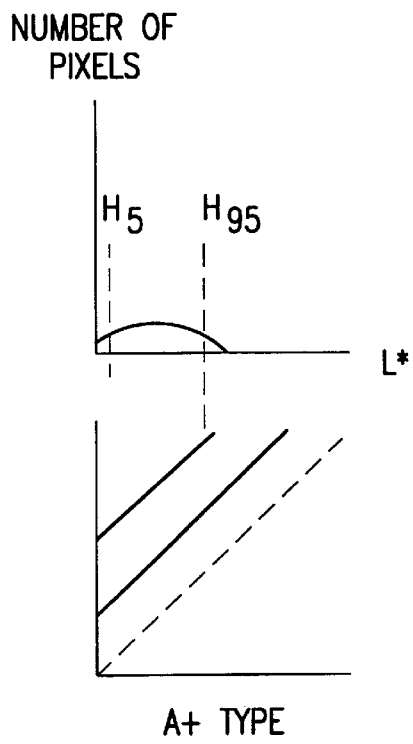
FIGS. 12A and B are a set of diagrams used to explain the types of lookup tables used in the "lightness-up" process.
Figure 12B:
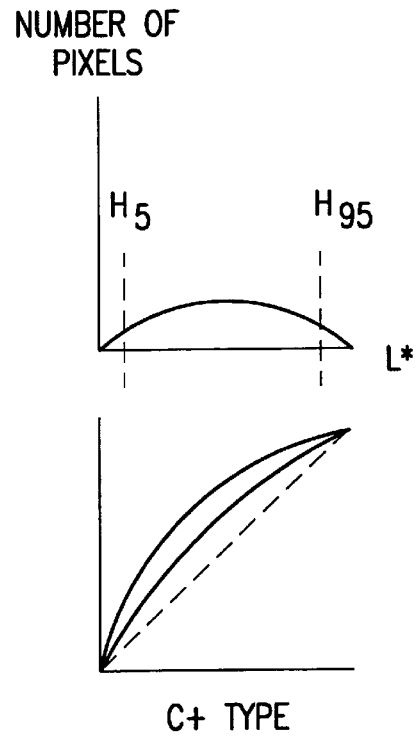

For a simple control of "lightness-up", the dark-area portion on the L* histogram of the subject area of the picture (this area is presumably not located in a bright area) is shifted in the lightness gaining direction by use of the A-type lookup table as shown on the left-hand side in FIG. 12. In case the span of histogram of the area to be treated is already wide, the mid-tone portion is pushed up in the lightness gaining direction by use of the C-type lookup table as shown on the right-hand side in FIG. 12. The criterion of choosing a lookup table is as to whether $H_{95}$ is larger than 50% or not, for example.

<Process parameter>

For the left-hand pattern of FIG. 12, strength 100 is determined mathematically from the value of $H_{95}$ as in the cases of left-hand and middle patterns of FIG. 11. The right-hand pattern of FIG. 12 is confined to the shape of lookup table that is narrowly free from the creation of defects of image, as in the case of the right-hand pattern of FIG. 11. Too much raising of the mid-tone results in a sharp tone rising at a high-lighted portion, and it causes tone jumping. Experiences reveal that the maximum gradient of rising of the lookup table at a high-lighted portion is preferably around 1.5.

Figure 13:
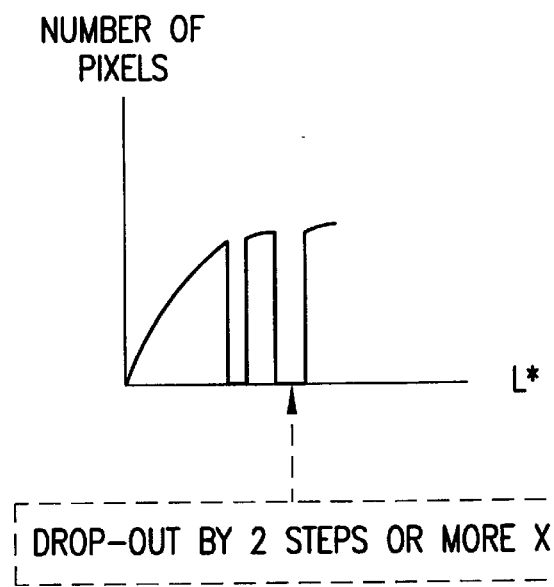
FIG. 13 is a diagram used to explain the selection of the optimal type of lookup table used in the "lightness-up" process.
Figure 14A:
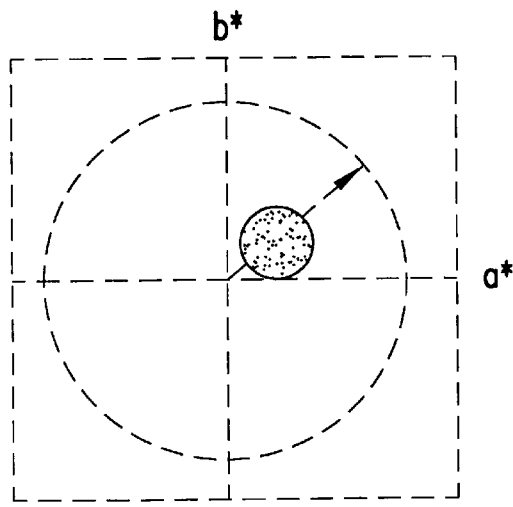
FIGS. 14A–14D are a set of diagrams used to explain the designation of a lookup table used in the "color emphasis" process.
Figure 14B:
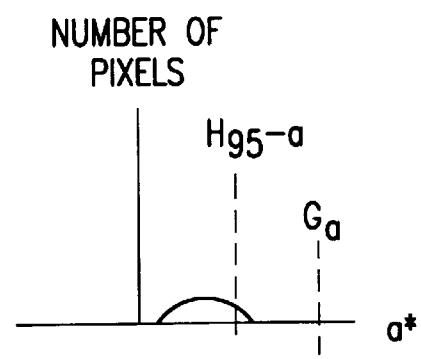
Figure 14C:
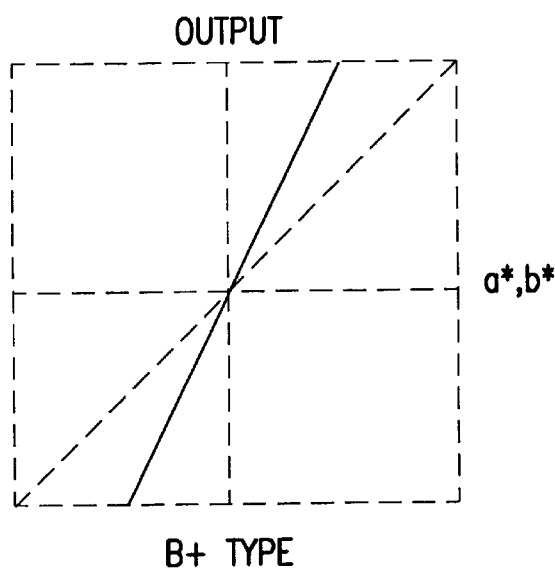
Figure 14D:
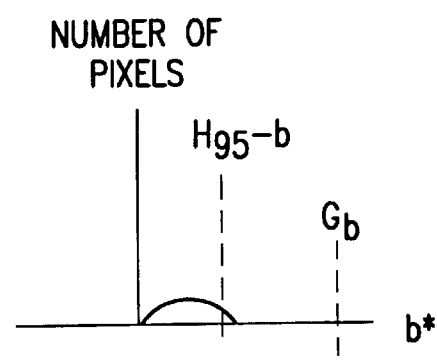

The C+ type lookup table calculated as explained above is used to obtain the optimal value in the same manner as the preceding case 1. On the histogram of the processed image, if there are two consecutive tones without pixel in a high-lighted portion, as shown in FIG. 13, the occurrence of tone jump is assumed, and the calculation is done again by reducing the limited gradient of rising of the lookup table. These steps of process are repeated until the above-mentioned condition is met thereby to obtain the lookup table of strength 100.

The Variation of the obtained strength 100 is displayed so as to let the user select a preferred strength.

(3) C*/Color Emphasis
<Process Charac.>

Although an LCH picture can be treated in the same manner as those shown in FIG. 11 and FIG. 12, with L* being replaced with C*, the following explains the simultaneous control of a*/up and b*/up for the picture having the Lab space. The process simply uses two lookup tables of (a*/b*). The a*LUT and b*LUT are the same one, and it is a linear lookup table passing through the origin so that the hue does not vary.

A subject picture discriminated to be a colored stuff in this invention is known to have a relatively narrow color region on the a*-b* plane. Accordingly, the process uses two B-type lookup tables in general. In case the color region takes a large area, the E-type lookup table is used at a risk of slight variation of hue when the following condition is met with respect to certain threshold values $H_{low}$ and $H_{high}$.

$H_{95-a} > H_{high}$ and $H_{5-a} < H_{low}$, or $H_{95-b} > H_{high}$ and $H_{5-b} < H_{low}$ It is also known that the process of raising the saturation is preferably accompanied by the raising of lightness for the sake of a better result, although no further discussion is aimed here.

<Process Parameter>

The following explains an example of process using two B-type lookup tables. If the color region of the subject after the saturation-up process exceeds the band (Gamut), a defective image due to the collapse of color will result. For preventing this impropriety from occurring, the process strength (gradient of lookup table) must be determined with respect to the $H_{95-a}$ and $H_{95-b}$ and the shape of the band (Gamut).

Initially, point M of the maximum C* in the color region is found to obtain the border values (Ga,Gb) of the Gamut in the hue direction of the point M. Next, the maximum multiplication factors are calculated from $H_{95-a}$ and $H_{95-b}$, Ga and Gb, and the smaller one is selected (refer to FIG. 14 and the following formula).

Strength 100 lookup table (gradient)=min(Ga/$H_{95-a}$ Gb/$H_{95-b}$)*S

Generally, the Gamut shape is complex and different depending on the printer, and therefore it is examined as to whether the processed image is included within the Gamut. For example, in case the number of pixels outside the Gamut is 5% or more of the number of pixels to be treated, the multiplication factor S (S<1.0) is decremented to calculate the gradient of lookup table again. By repeating this operation, the optimal process parameter can be obtained.

The Variation of this process parameter (maximum value) is presented to the user, as in the preceding cases 1 and 2.

Calculation by use of the E-type lookup table, with tone jump being minded, can be done in the same manner as explained in the preceding case 1.

Next, in regard to the spatial frequency process, the manner of calculating the process parameter from the feature value will be explained.

(4) Edge value/edge emphasis

Process operators of the process operator set, e.g., attribute parameter: edge value, algorithm: DF, and process charac.: high-band emphasis, are calculated by the calculation of process strength of the basic high-band emphasizing filter prepared in advance by using the feature value pertinent to the edge value of the subject picture.

Figure 15:
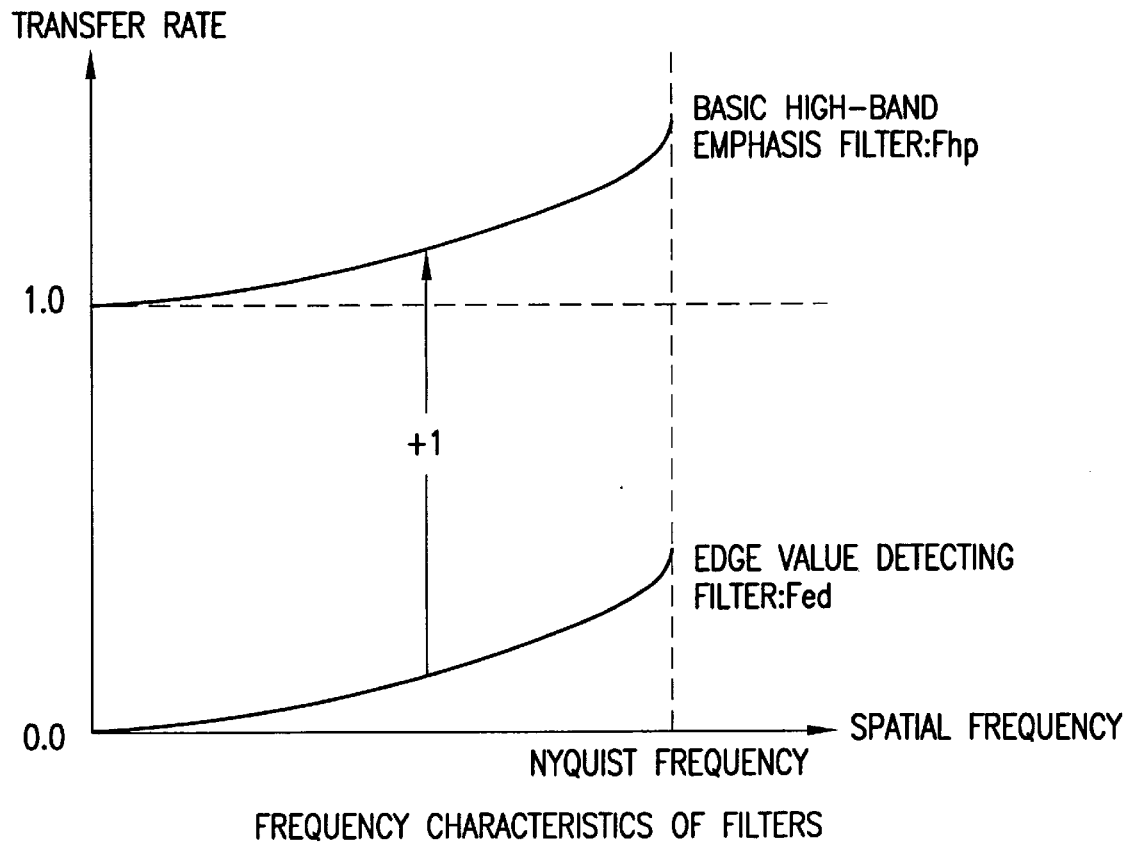
FIG. 15 is a graph showing the frequency characteristics of the 2-dimensional FIR filter used for evaluating the edge feature value.
Figure 16:
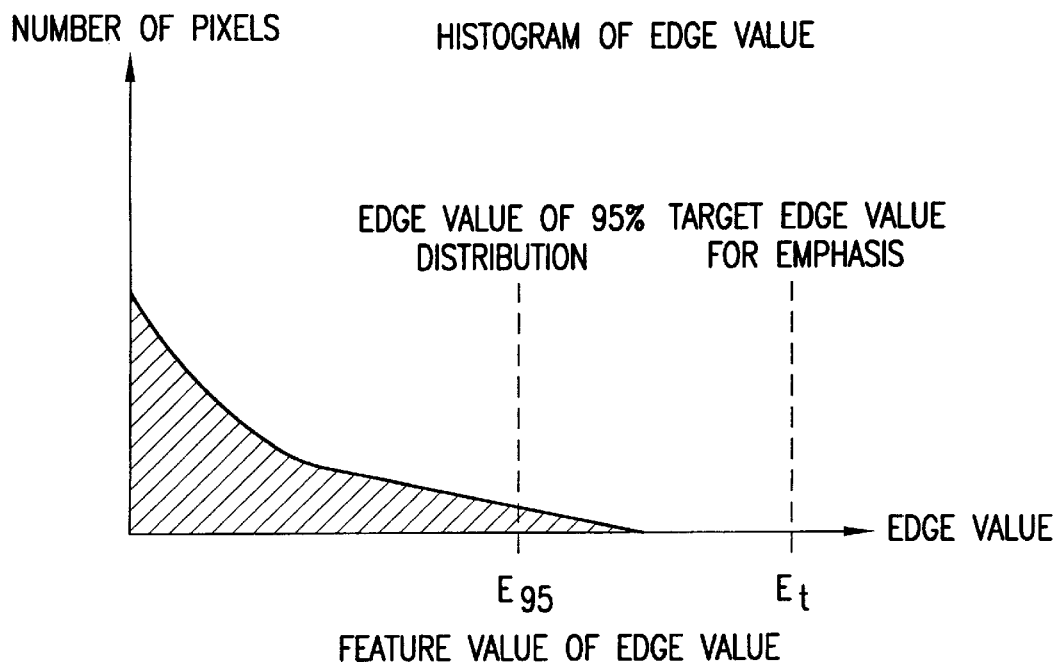
FIG. 16 is a graph used to explain the evaluation of the edge feature value from the edge value histogram.

The feature value of edge value is calculated by use of the 2-dimensional FIR (finite impulse response) filter which converts a pixel in attention in the image data into a value based on the weighted summation of the pixel in attention and surrounding pixels. For example, the 2-dimensional FIR filter having spatial frequency transfer characteristics Fed (frq) only in its high-frequency components as shown in FIG. 15 is used for the edge value detection filter, and the edge value is obtained as the absolute value of the filtered value. The histogram of the edge value calculated for the subject picture is produced, and the edge value $E_{95}$ at which 95% pixels are included as shown in FIG. 16, for example, is calculated as the feature value.

<Process Charac.>

The basic high-band emphasizing filter prepared in advance is a 2-dimensional FIR filter similar to the edge value detection filter, and it has spatial frequency transfer characteristics Fed (frq) as shown in FIG. 15 for example.

The edge value detecting filter and basic high-band emphasizing filter are designed to have their transfer characteristics at the spatial frequency frq=x related to be Fhp (x)=Fed(x)+1. Namely, the edge value detection filter is a 2-dimensional FIR filter having its sum of factors equal to zero, and the basic high-band emphasizing filter is a 2-dimensional FIR filter having one filter factor equal to that of the edge value detection filter added by one and another filter factors equal to that of the edge value detection filter having its sum of filter factors equal to one.

<Process Parameter>

Prior to the calculation of the processing speed of the basic high-band emphasizing filter, the feature value $E_{95}$ of the edge value of the subject picture is compared with the target edge value Et which has been calculated statistically from usual pictures that give a sharp impression, as shown in FIG. 16.

If $E_{95}$ is greater than or equal to Et, the strength value G is set to the preset basic process strength value *, or otherwise it is set to (Et-$E_{95}$)/$E_{95}$.

The filter factor of high-band emphasizing filter, by which the process strength is G times that of the basic high-band emphasizing filter, can be calculated from the factor of edge value detecting filter based on the relation of these filters mentioned above. Specifically, for a pixel in attention, the filter factor of the edge value detecting filter multiplied by G and added by 1 and, for the remainder, the filter factors of the edge value detecting filter multiplied by G become the filter factors of the high-band emphasizing filter. Parameter calculation now completes.

Accordingly, by implementing the high-band emphasizing filter process by use of the process strength which is calculated automatically from the feature value of the edge value, the feature value $E_{95}$ of the edge value of the processed image becomes equal to the target edge value Et mentioned above, and a picture which is edge-emphasized properly can be obtained.

Figure 18:
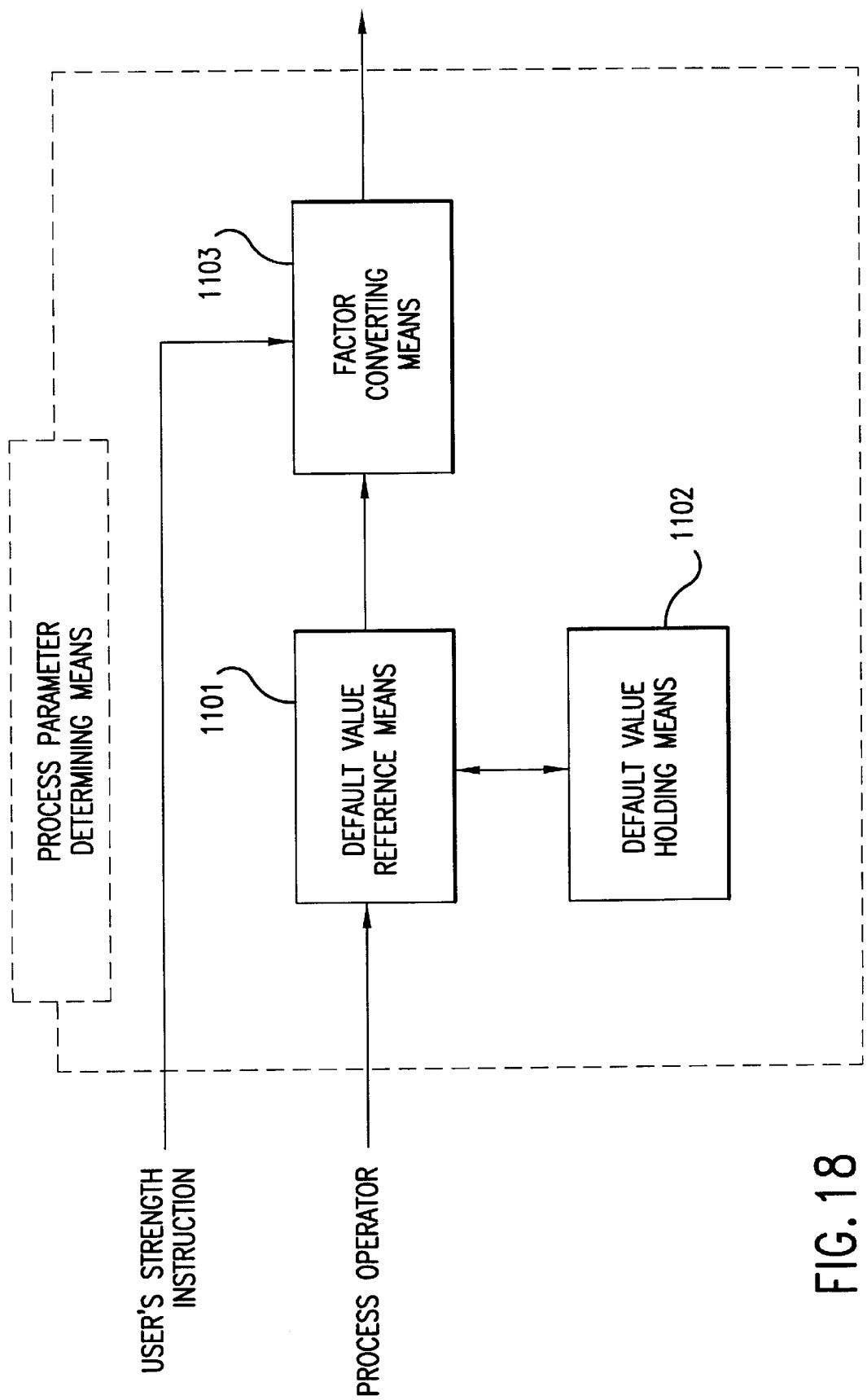
FIG. 18 is a block diagram showing the arrangement of the process parameter determining section.

The foregoing parameter determination will be further explained in brief with reference to FIG. 17 and FIG. 18. FIG. 17 lists the manners of process parameter determination, which are based on default values, calculation from the feature value, user's instruction, and Variation which is the combination of these manners with candidate presentation. Default values are preset in advance for each algorithm (DF and LUD). For example, for the A-type lookup table, the default value is "shift in 1/256 steps." The B-typen and C-type lookup tables also have presettings of minimum step values. For the digital filters (DF) including the smoothing filter and wide-band emphasizing filter, templates of minimum step values are preset. These default values are only examples, and other default values can also be used.

FIG. 18 shows the process of the case where the process parameter is determined from default values. The process operator is fed to the default value reference section 1101, which then fetches a corresponding default value from the default value holding section 1102 and gives it to the factor converting section 1103. In response to the user is instruction of parameter strength, e.g., k times the default value, the default value multiplied by k is released as process parameter. The default value is delivered intact if k=1.0 is instructed.

Next, a number of specific examples of the improvement of Q-effect and 3D-effect by the inventive image processing apparatus will be explained.

Figure 19C:
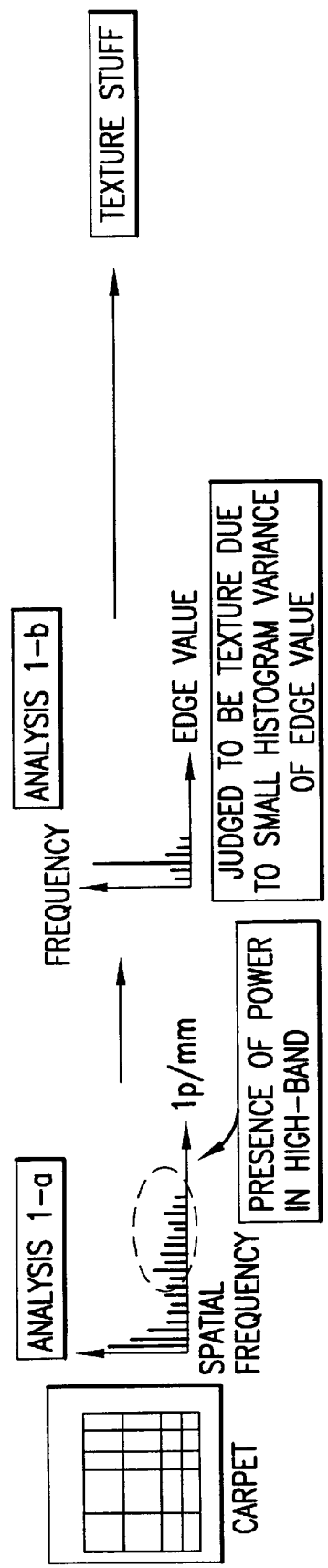
Figure 20:
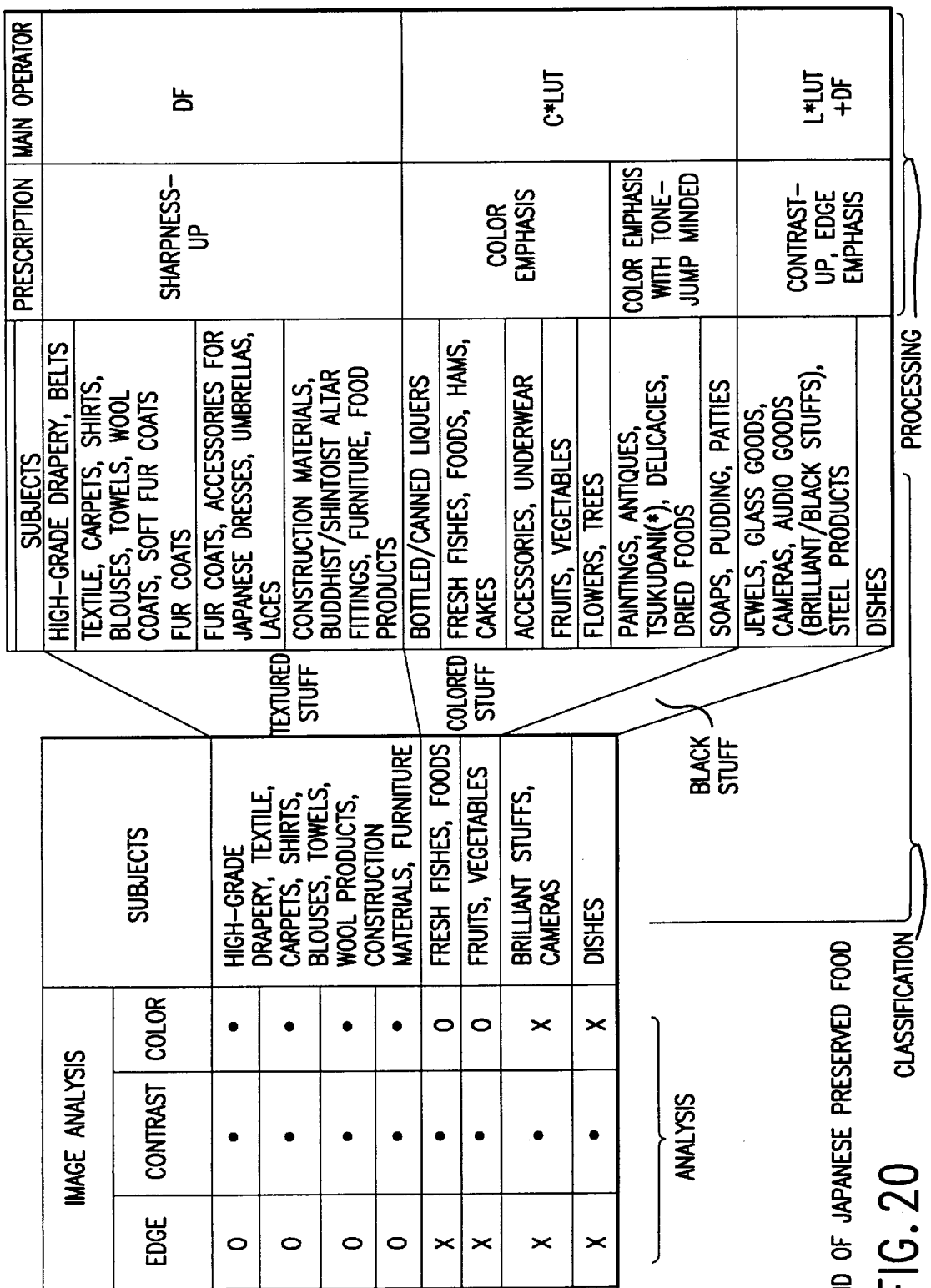
FIG. 20 is a table showing the correlation among image analysis, classification, and processing in the image process for the purpose of Q-effect enhancement.

FIG. 19 and FIG. 20 explain the image analysis, classification and processing for the improvement of Q-effect. FIG. 19 explains the image analysis for subject pictures of fish eggs, camera and carpet. For the picture of fish eggs at the top of FIG. 19, the spatial frequency analysis is conducted, which reveals the absence of high-frequency power in this image data. Accordingly, the image data is found to be a non-texture stuff, and the sequence proceeds to the analysis of color distribution. The color distribution analysis takes place separately for the color spaces L*a*b*, revealing the image data to be of colored stuff from the analysis results of (a*/b*).

For the picture of camera at the middle of FIG. 19, the spatial frequency analysis is conducted, which reveals the presence of high-frequency power in this image data, indicating the possibility of texture stuff. Next, it is examined based on the histogram analysis of the edge as to whether the high-frequency power is derived from the texture or edge. Since the picture of camera provides a large edge histogram variance, the high-frequency power resulting from the spatial frequency analysis is found to be caused by the edge. Next, the color distribution analysis takes place separately for the color spaces L*a*b*, revealing the image data to be of colored stuff from the analysis results of (a*/b*).

For the picture of carpet at the bottom of FIG. 19, the spatial frequency analysis is conducted, which reveals the presence of high-frequency power in this image data, indicating the possibility of texture stuff. Next, it is examined based on the histogram analysis of the edge as to whether the high-frequency power is caused by the texture or edge. Because of a small edge histogram variance resulting from the picture of carpet, this picture is found to be texture stuff.

FIG. 20 summarizes the foregoing image analysis, classification, and process mode for the improvement of Q-effect of subject pictures. The central columns show subject pictures and their classification into texture stuff, colored stuff and black stuff, and the left-hand columns show by marks "o" and "x" the results of image analysis pertaining to the edge, contrast and color. Marked by * are items of analysis that are not required for the process of improving the Q-effect. The right-hand columns show the prescription and main operator of the process relevant to the pictures of each type. It will be appreciated from this table that individual subject pictures often necessitate different processes despite the same instruction of Q-effect improvement. Next, the process for the improvement of 3D-effect of pictures will be explained with reference to FIG. 21 and FIG. 22.

Figure 21C:
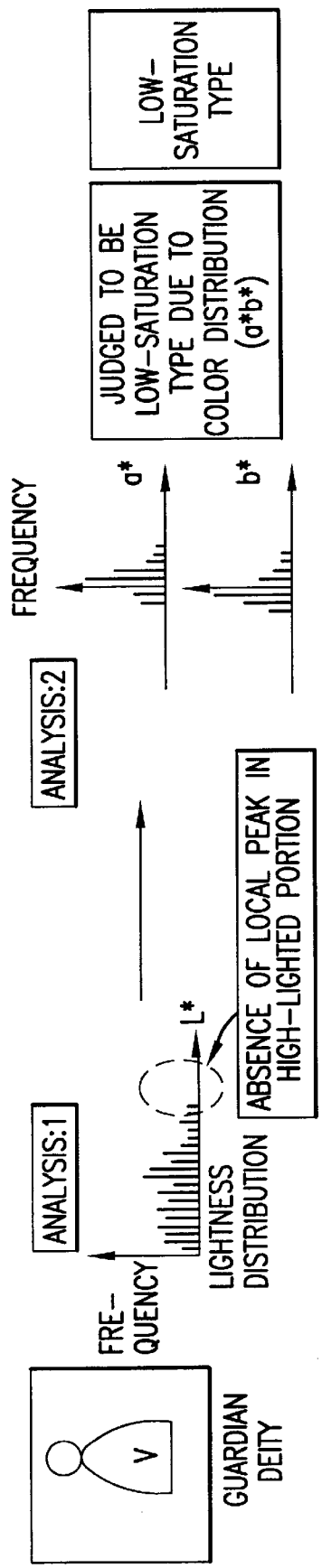

FIG. 21 explains the image analysis for subject pictures of pudding, a carrot and a guardian deity. As analysis 1, the lightness distribution is analyzed for the subject pictures thereby to find a local peak in the high-lighted portion. The picture of pudding has a local peak, and this picture is found to be of catch-light type. The analysis results for the pictures of a carrot and a guardian deity do not indicate local peaks attributable to high-lighted portions, and the catch-light type is denied for these pictures. Subsequently, as analysis 2, the color distributions (a*/b*) are analyzed. The analysis results of color distribution reveal that the picture of a carrot is of high-saturation type, and the picture of a guardian deity is of low-saturation type.

FIG. 22 summarizes the image analysis, classification, and process mode for the improvement of 3D-effect of subject pictures. The central columns show subject pictures and their classification into the catch-light, high-saturation and low-saturation types, and the left-hand columns shown by marks "o" and "x" are the results of image analysis pertaining to the edge, catch-light and color. Marked by * are items of analysis that are not required for the process of improving the 3D-effect. The right-hand columns show the prescription and main operator of the process relevant to the pictures of each type. It will be appreciated from this table that individual subject pictures often necessitate different processes despite the same instruction of 3D-effect improvement.

As described above, the inventive image processing apparatus carries out the image processing by selecting a proper image process operator and an image process parameter in accordance with the user's instruction and the feature of the image data, whereby it is possible for the user to carry out easily the proper image processing that matches with each subject picture and obtain intended pictures efficiently.

What is claimed is:

1. An image processing apparatus comprising:

image quality control instructing means which receives instruction information for the enhancement of qualitative effect on feeling (Q-effect) of input image data;

image data recognizing means which classifies the image data into image data of a texture stuff which has texture, image data of a black stuff which does not have texture and is virtually monochromatic, and image data of colored stuff which does not have texture and is chromatic;

process operator characteristics holding means which holds an image process operator for enhancement of sharpness, an image process operator for the emphasis of contrast or edge, and an image process operator for the emphasis of color of the subject picture in correspondence to image data of texture stuff, black stuff and colored stuff, respectively;

image process operator determining means which makes reference to said process operator characteristics holding means in accordance with the instruction information provided by said image quality control instructing means to select an image process operator for the result of classification provided by said image data recognizing means; and image processing means which applies the image process operator selected by said image process operator determining means to said subject picture.

2. An image processing apparatus comprising:

image quality control instructing means which receives instruction information for the enhancement of sizzle-effect or 3-dimensional effect on feeling (3D-effect) of input image data;

image data recognizing means which classifies the image data into image data of catch-light type which has catch-light, image data of low-saturation type which does not have catch-light and is virtually monochromatic, and image data of high-saturation type which does not have catch-light and is virtually chromatic;

process operator characteristics holding means which holds an image process operator for emphasis of contrast, an image process operator for emphasis of edge, and an image process operator for enhancement of color of the subject picture in correspondence to the image data of catch-light type, low-saturation type and high-saturation type, respectively;

image process operator determining means which makes reference to said process operator characteristics holding means in accordance with the instruction information provided by said image quality control instructing means to select an image process operator for the result of classification provided by said image data recognizing means; and image processing means which applies the image process operator selected by said image process operator determining means to said subject picture.

3. An image processing apparatus comprising:

image quality control instructing means which receives quality control instruction information for input image data;

image data recognizing means which recognizes attribute information of the image data;

image process operator determining means which determines an image process operator in accordance with the quality control instruction information received by said image quality control instructing means and image data attribute information recognized by said image data recognizing means;

image process parameter determining means which determines an image process parameter that establishes a characteristic of the image process operator determined by said image process operator determining means; and image processing means which implements the image process for said image data based on said image process operator and said image process parameter.

4. An image processing apparatus according to claim 3, wherein said image data recognizing means comprises image data analysis means which analyzes said image data.

5. An image processing apparatus according to claim 4, wherein said image process parameter determining means determines an image process parameter based on image analysis information provided by said image data analysis means.

6. An image processing apparatus according to claim 4, wherein said image data analysis means analyzes said image data to detect the presence or absence of texture and discriminates the subject picture to be texture stuff on detecting the presence of texture, said image process operator determining means and said image process parameter determining means determine an image process operator and image process parameter for the enhancement of sharpness for the image data discriminated to be of texture stuff, and said image processing means implements an image process based on the determined image process operator and the image process parameter for the sharpness enhancement thereby to improve the Q-effect of the image data.

7. An image processing apparatus according to claim 4, wherein said image data analysis means analyzes the image data to detect the presence or absence of the texture and analyzes the color distribution of the image data and discriminates the subject picture to be black stuff on detecting the absence of texture and virtually monochromatic distribution, said image process operator determining means and said image process parameter determining means determine an image process operator and an image process parameter for the enhancement of contrast of lightness for the image data discriminated to be of black stuff, and said image processing means implements the image process based on the image process operator and the image process parameter determined, for enhancement of lightness contrast thereby to improve the Q-effect of the image data.

8. An image processing apparatus according to claim 4, wherein said image data analysis means analyzes the image data to detect the presence or absence of texture and analyzes the color distribution of the image data and discriminates the subject picture to be of colored stuff on detecting the absence of texture and virtually chromatic distribution, said image process operator determining means and said image process parameter determining means determine an image process operator and an image process parameter for enhancement of saturation for the image data discriminated to be of colored stuff, and said image processing means implements the image process based on the image process operator and the image process parameter determined, for enhancement of saturation thereby to improve the Q-effect of the image data.

9. An image processing apparatus according to claim 4, wherein said image data analysis means analyzes the image data to detect the presence or absence of catch-light and discriminates the subject picture to be of catch-light type on detecting the presence of catch-light, said image process operator determining means and said image process parameter determining means determine an image process operator and an image process parameter for enhancement of the contrast of lightness for the image data discriminated to be of catch-light type, and said image processing means implements the image process based on the image process operator and the image process parameter determined, for enhancement of lightness contrast thereby to improve the 3D-effect of the image data.

10. An image processing apparatus according to claim 4, wherein said image data analysis means analyzes the image data to detect the presence or absence of catch-light and the color distribution of the image data and discriminates the subject picture to be of low-saturation type on detecting the presence of catch-light and virtually nonchromatic distribution, said image process operator determining means and said image process parameter determining means determine an image process operator and an image process parameter for enhancement of edge contrast for the image data discriminated to be of low-saturation type, and said image processing means implements the image process based on the image process operator and the image process parameter determined, for enhancement of edge contrast thereby to improve the 3D-effect of the image data.

11. An image processing apparatus according to claim 4, wherein said image data analysis means analyzes the image data to detect the presence or absence of catch-light and the color distribution of the image data and discriminates the subject picture to be of high-saturation type on detecting the presence of catch-light and virtually chromatic distribution, said image process operator determining means and said image process parameter determining means determine an image process operator and an image process parameter for enhancement of contrast of saturation for the image data discriminated to be of high-saturation type, and said image processing means implements the image process based on the image process operator and the image process parameter determined, for the enhancement of saturation contrast thereby to improve the 3D-effect of the image data.

12. An image processing apparatus according to claim 3, wherein said image data recognizing means recognizes attribute information supplied as image data attribute information from external input means.

13. An image processing apparatus according to claim 5, wherein, said image data recognizing means determines a histogram variance as the image analysis information, and said image process parameter determining means determines the image process parameter based on the histogram variance.

* * * * *